United States Patent
Krzyzak et al.

(10) Patent No.: US 10,035,725 B2
(45) Date of Patent: Jul. 31, 2018

(54) X-RAY AND GAMMA-RAY SHIELDING GLASS

(71) Applicant: Schott AG, Mainz (DE)

(72) Inventors: Marta Krzyzak, Bad Gandersheim (DE); Antoine Carré, Mainz (DE); Lothar Niessner, Duingen (DE); Andreas Hegemann, Alfeld (DE)

(73) Assignee: Schott AG, Mainz (DE)

( * ) Notice: Subject to any disclaimer, the term of this patent is extended or adjusted under 35 U.S.C. 154(b) by 16 days.

(21) Appl. No.: 15/423,052

(22) Filed: Feb. 2, 2017

(65) Prior Publication Data

US 2017/0217823 A1 Aug. 3, 2017

(30) Foreign Application Priority Data

Feb. 2, 2016 (DE) .......... 10 2016 201 571
Jan. 12, 2017 (DE) .......... 10 2017 200 413

(51) Int. Cl.
| | | |
|---|---|---|
| *C03C 3/00* | (2006.01) | |
| *C03C 3/072* | (2006.01) | |
| *C03B 15/02* | (2006.01) | |
| *C03B 17/06* | (2006.01) | |
| *C03B 33/02* | (2006.01) | |
| *C03B 35/16* | (2006.01) | |
| *C03C 3/07* | (2006.01) | |
| *C03C 4/08* | (2006.01) | |
| *G21F 1/06* | (2006.01) | |

(52) U.S. Cl.
CPC .............. *C03C 3/072* (2013.01); *C03B 15/02* (2013.01); *C03B 17/06* (2013.01); *C03B 33/02* (2013.01); *C03B 35/16* (2013.01); *C03C 3/07* (2013.01); *C03C 4/08* (2013.01); *C03C 4/087* (2013.01); *G21F 1/06* (2013.01); *C03C 2204/00* (2013.01)

(58) Field of Classification Search
CPC .......... C03C 3/072; C03C 3/07; C03C 4/087; C03C 4/08; C03C 2204/00; C03B 17/06; C03B 15/02; C03B 33/02; C03B 35/16; G21F 1/06
USPC ................................ 250/505.1, 515.1, 517.1
See application file for complete search history.

(56) References Cited

U.S. PATENT DOCUMENTS 8,119,999 B2 * 2/2012 Choju .................. C03C 3/07
250/515.1

FOREIGN PATENT DOCUMENTS

| DE | 454 430 | 1/1928 |
| DE | 102 03 226 A1 | 9/2003 |
| EP | 1 939 147 A1 | 7/2008 |

(Continued)

OTHER PUBLICATIONS

"Schott Guide to Glass" Second Edition, Chapman & Hall, London 1996, Table 6.3 p. 132-133 (1 page).

*Primary Examiner* — Michael Maskell
(74) *Attorney, Agent, or Firm* — Taylor IP, P.C.

(57) ABSTRACT

An X-ray and gamma-ray shielding glass, including the following components in weight-%:
  10-35% $SiO_2$;
  60-70% PbO;
  0-8% $B_2O_3$;
  0-10% $Al_2O_3$;
  0-10% $Na_2O$;
  0-10% $K_2O$;
  0-0.3% $As_2O_3$;
  0-2% $Sb_2O_3$;
  0-6% BaO; and
  0.05-2% $ZrO_2$.

19 Claims, 4 Drawing Sheets

(56) References Cited

FOREIGN PATENT DOCUMENTS

JP  2002-226755 A   8/2002
WO  2011/052336 A1  5/2011

\* cited by examiner

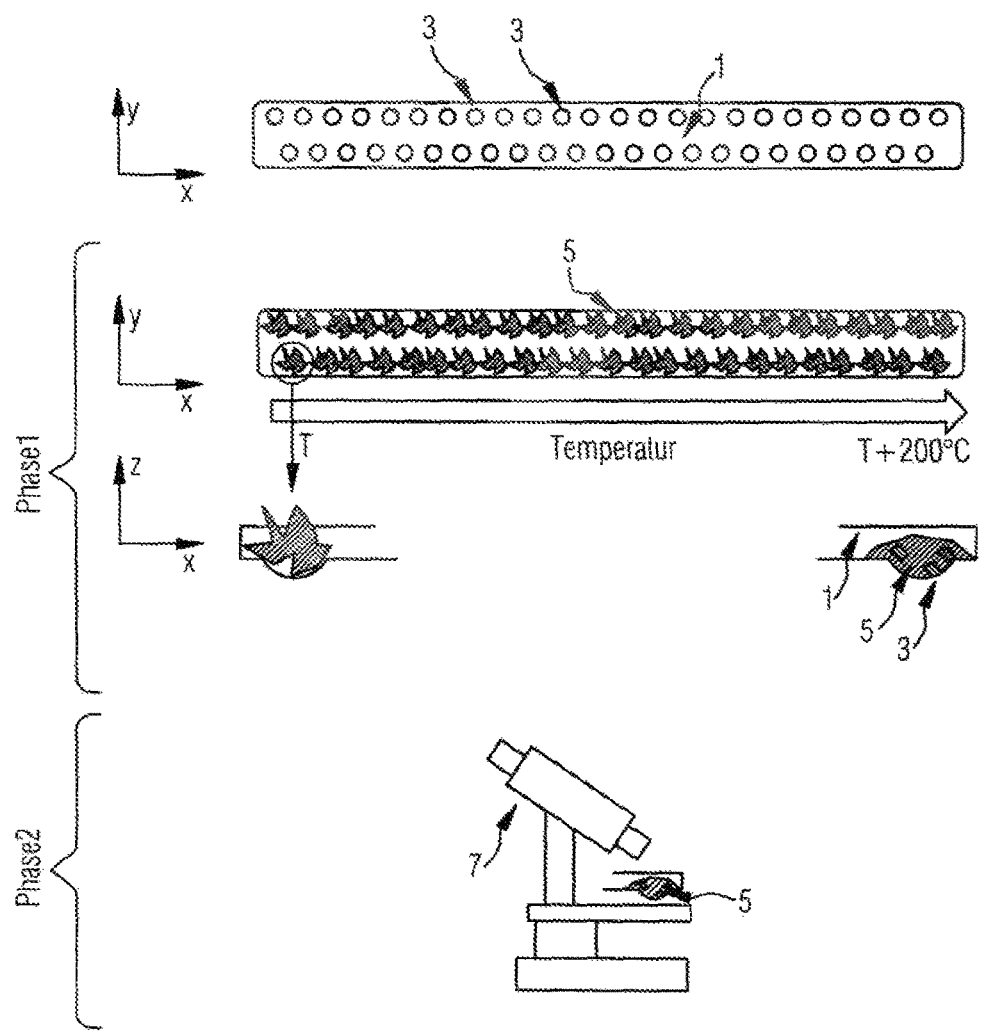

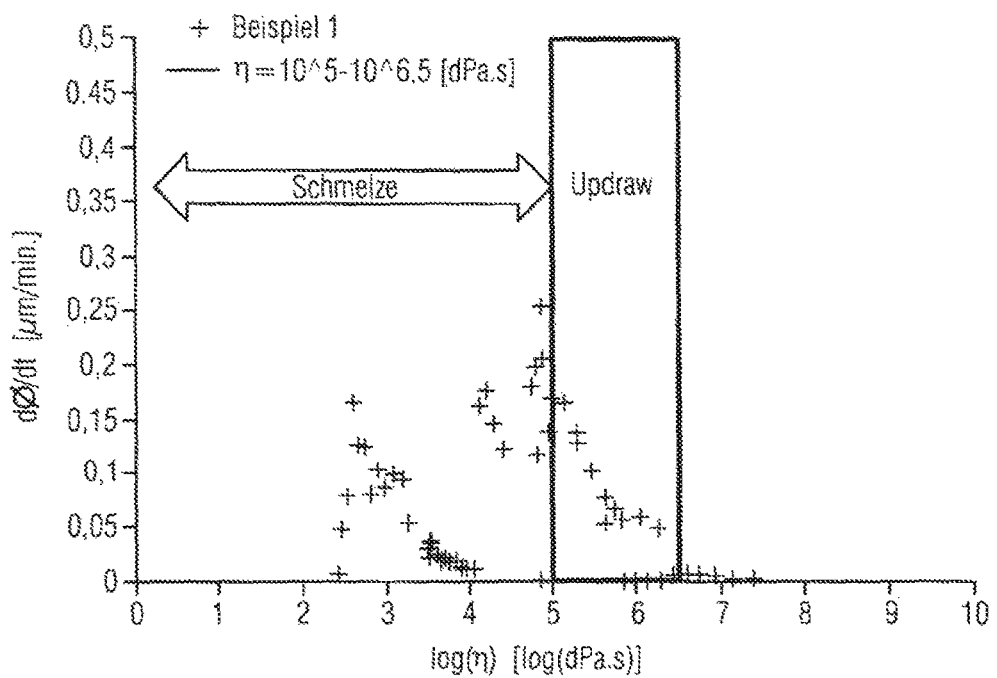

X-RAY AND GAMMA-RAY SHIELDING GLASS

BACKGROUND OF THE INVENTION

1. Field of the Invention

The present invention relates to X-ray and gamma-ray shielding glass, as well as a method to produce X-ray and gamma-ray shielding glass.

2. Description of the Related Art

Gamma radiation is understood to be radiation with quantum energies of more than 200 keV, regardless of the nature of their origin. In this general sense, the description differentiates from the X-ray radiation. In contrast, X-ray radiation comprises an energy between 100 eV to 300 keV.

Gamma-ray and X-ray shielding glass with a high lead content have become known from a multitude of applications.

Glasses marketed by the Schott Company, having a composition of 34.3 weight-% $SiO_2$, 5.6 weight-% $K_2O$ and 59.6 weight-% PbO that are sold under Schott-Glass 8531 are known in the art. This glass composition can be gathered from "Schott Guide to Glass" Second Edition, Chapman & Hall, London 1996, Table 6.3 page 132-133.

EP 1 939 147 A1 shows a gamma-ray shielding glass plate, wherein the glass plate has a glass composition with a high lead content and is characterized in that—at a thickness of 10 mm or more—it offers total light transmission at a wavelength of 400 nm of 50% or more.

From DE 454 430 a glass composition with more than 50% lead oxide and a maximum of 10% zirconium oxide has become known. It is not described in DE 454 430 whether the percentage values regarding the glass composition refer to mol-% or weight-%. Further, a single embodiment having 30 percent $SiO_2$, 5 percent $ZrO_2$, 60 percent PbO and 5 percent $K_2O$ has become known from DE 454 430. It is also not known from DE 454 430 that the glass composition can be converted to a plate having high transparency.

WO 2011/052336 A1 describes a lead-containing glass composition having high lead contents of 75 weight-% to 82 weight-% and zirconium contents between 0.5 weight-% and 5.5 weight-%. The problem also exists in WO 2011/052336 that these types of glasses cannot be converted into high transparency plates.

JP 2001/29444 A specifies materials for a plasma display, including a glass powder of a base glass and of a glass filler. The base glass is a glass having a high lead content with 50-75 weight-% PbO, as is the case also with the glass filler. The lead contents of the glasses that, in JP 2001/29444 A contain $ZrO_2$, are higher than 67 weight-%.

DE 102 03 226 A1 describes an optical glass with 55-88 weight-% PbO and 0-10 weight-% $ZrO_2$. The optical glasses according to DE 102 03 226 A1 relate in particular to optical glasses for projection purposes. Plates manufactured from such glasses are not shown in DE 102 03 226 A1.

One disadvantage of all aforementioned glasses during manufacture of the same is the crystallization tendency of these glasses. Because of this, such glasses cannot be produced for example in a draw process, because they crystallize too quickly for such draw processes. An additional problem may be that with such glasses the transmission of light is strongly limited.

The crystallization rate should generally not exceed a limit of 0.1 µm/min. within a temperature range that between the melting temperature of the glass (in this case the melting temperature of the mixture in the melting chamber) and the temperature at which the viscosity of the glass of $10^{6.5-7.0}$ dPa·s is limited.

The liquidus temperature is the temperature at which, when exceeded a material is completely melted. In practice, it is the highest temperature above which no more crystals are observed. Regarding the observation of crystals, we refer to the following description. The crystallization rate is herein defined by factor dØ/dt, namely the time derivative of the average diameter of the crystals, measured for a certain temperature. If the crystallization rate is greater than 0.1 µm/min. It is necessary—because of their size—to again polish the crystals mechanically. This improves the surface quality as well as the transmission of the glass plate.

Methods for producing glass plates of this type are for example down-draw or up-draw processes, without being limited thereto.

The glasses can of course also be produced by other methods, for example by a redraw method, a rolling method or smaller sizes also in a press process.

In the up-draw process a thin or flat glass is produced, wherein the glass ribbon is drawn from the bottom upwards, via a draw nozzle and various rolls through a cooling section. Up-draw methods are characterized by excellent surface quality and a wide thickness spectrum of 0.8 mm to 20 mm, for example 0.8 mm to 10 mm.

Alternatively to the up-draw method, a down-draw method may be used. The down-draw method serves to produce thin or thinnest glass. In the down-draw method a glass ribbon is also drawn over several rolls through a cooling section, but it is drawn downwards. In the down-draw method, glass ribbons having a low surface roughness that can be less than 1 nm can be produced, wherein the thickness spectrum generally is between 25 µm to 1.1 mm.

An additional disadvantage of the glasses according to the state of the art is the glasses insufficient hydrolytic resistance, which leads to problems, especially when cleaning the glasses, for example when they are used in the medical field.

What is needed in the art is an X-ray and gamma-ray shielding glass composition that avoids the disadvantages of the current state of the art. Plates produced from such a glass composition should have a high transparency and facilitate shielding of X-rays and gamma-rays. In addition to high transparency, such glasses should also have a high hydrolytic resistance. The glass compositions should moreover have a low crystallization tendency and should be suitable for a draw process, for example an up-draw process.

SUMMARY OF THE INVENTION

The present invention provides a glass composition that includes the following in weight-%:
  10-35%, for example 20-30% $SiO_2$
  60-70%, for example 60-67%, for example 60-65% PbO
  0-8% $B_2O_3$, for example 1-5% $B_2O_3$, for example 1.5-2.5% $B_2O_3$
  0-10% $Al_2O_3$, for example 0% $Al_2O_3$
  0-10%, for example 0.05-2% $Na_2O$
  0-10%, for example 0.1-3% $K_2O$
  0-0.3% $As_2O_3$
  0-2%, for example 0.1-0.5% $Sb_2O_3$
  0-6% BaO %, for example 0% BaO
  0.05-2% $ZrO_2$, for example
  0.1-2% $ZrO_2$, for example 0.5-2% $ZrO_2$,
  for example, 1-2% $ZrO_2$
According to the invention the glass is thus characterized in that it contains $ZrO_2$. The $ZrO_2$ content can be in the range of 0.05-2 weight-%, for example between 0.1-2 weight-%, for example between 0.5 and 2 weight-%, for example between 1 and 2 weight-%. The addition of $ZrO_2$ in an amount of at least 0.1 weight-%, for example 0.5 weight-% to 2 weight-% greatly increases the hydrolytic resistance of the glass, so that cleaning of the glass with different aqueous media is possible. Furthermore, no crystals could be found in the glasses that had at least 0.1 weight-% $ZrO_2$.

BaO-free glasses have less crystallization tendency and can therefore be drawn easier. For example, glasses that, except for contaminants, are free of BaO, in other words glasses whose BaO content is around 0% can be drawn easier.

Furthermore, the glass can have a content of 0.1-10 weight-% $Al_2O_3$, for example 1-5 weight-% $Al_2O_3$. The addition strengthens the glass against aqueous corrosion.

In another embodiment, the inventive composition includes 1-8 weight-% $B_2O_3$, for example 1-5 weight-% $B_2O_3$, for example 1.5-2.5 weight-% $B_2O3$. Surprisingly it was found that a certain $B_2O_3$ content in the glass composition stabilizes the same against too rapid crystallization, in other words, it inhibits crystallization.

According to the invention the glass composition includes 0.05-8 weight-% $ZrO_2$, for example 0.1-8 weight-% $ZrO_2$, 0.5-6 weight-% $ZrO_2$, 0.5-4 weight-% $ZrO_2$, or 0.75-1.5 weight-% $ZrO_2$.

$ZrO_2$ in the glass composition surprisingly causes the glasses to be more resistant hydrolytically than conventional glasses without $ZrO_2$. The resistance to aqueous solutions increases with $ZrO_2$. If there is a $ZrO_2$ content in the glass, then the $Al_2O_3$ content can be at 0%. This means the glass can be $Al_2O_3$-free with the exception of contaminants, and notwithstanding the $Al_2O_3$-freedom, sufficient resistance against aqueous solutions is achieved. Regarding the alkali content, the sum of all alkalis $Na_2O+K_2O$ can be between 0.25 and 10 weight-%, for example 0.25 and 5 weight-%. The alkalis in the glasses produce eutectic and thus reduce the liquidus temperature. Consequently, the melting temperature also drops, leading to a reduction in the energy consumption. The addition of alkalis also facilitates the reduction of the liquidus temperature in such a way that highly viscous melts are provided which in turn are compatible with the draw process.

The glass composition can be selected so that the kinetic of crystallization $d\varnothing/dt$ is less than 0.3 μm/min., for example less than 0.2 μm/min., for example less than 0.01 μm/min.

Such crystallization kinetic in the glass composition surprisingly ensures that the glass can be produced in an up-draw process and that it has a lower crystallization tendency, wherein also high transparency and better surface quality is achieved. The required crystallization kinetic ensures, that the crystals form at temperatures that are separate from process temperatures during the up-draw process. It is therefore possible to present the crystallization kinetic as a function of the viscosity in order to be able to completely characterize the process window. Surprisingly, the inventors found that it is important for a low crystallization tendency that the PbO-content be less than 70 weight-%, for example less than 67 weight-% and greater than 60 weight-%, and for the $ZrO_2$ content to be greater than 0.05 weight-%, and a maximum of 2 weight-%. Such PbO and $ZrO_2$ contents ensure on the one hand sufficient transmission of glass plates produced from such materials, and on the other hand such glass compositions can be drawn into glass plates.

The crystallization kinetic can be determined with the assistance of the Pt-sheet method or the Pt-plate method or platinum carrier plate method uniformly spaced apart recesses that hold glass samples. These are heated in a gradient kiln for a certain retention time (for example 16 hours). The glass samples in the individual recesses in the Pt-plate are thermalized at various temperatures, depending on the arrangement of the recesses. After thermalization, the glass samples are analyzed, for example with polarized light. From the measurements with polarized light in a microscope, the average size of the crystals in the recesses can then be determined and from this, the average crystal growth kinetic for every recess temperature.

The transmission of the glasses is measured with the assistance of a Lambda 950 spectrophotometer, produced by Perkin-Elmer. The samples measured 30×30×10 mm. After finish grinding of the light ingress surfaces and light-emitting surfaces, the samples are polished (optical polish). The front and rear surfaces are parallel to one another and have a maximum deviation of 1°. The front and rear surfaces are moreover produced as square relative to the floor as possible. The flatness is around PV=200 nm (PV=peak-to-valley) on a 10 mm diameter. The transmission measurements are conducted at a low speed. The scanned optical range that is the wavelength range is between 250 nm and 2500 nm and was examined in 2 nm increments. The light source is a tungsten-halogen lamp. The measurements are performed in climate controlled surroundings at T=22.0±1°. The measurement precision of the transmission is at ±0.3% for wavelengths that are specified as having an accuracy of ±1 nm.

A transmission of a 10 mm thick glass plate consisting of an inventive glass composition, measured as previously described, at a wavelength of 400 nm can be greater than 50%, for example greater than 70%, greater than 75%, or greater than 80%. The transmission of a 10 mm thick plate can be in the range of 75% to 90% of a 400 nm wavelength.

The viscosity of the glasses is determined with the assistance of various measuring methods:

In the range of $10^2$-$10^{6.5}$ dPa·s the viscosity is determined with an adjusted rotational viscometer by Haake (model Viscotester 550). The process is performed according to DIN ISO 7884-2 guide lines. With this method, it is possible to measure the measurement points with a 20 K temperature interval.

In the viscosity range of $10^{7.6}$-$10^9$ dPa·s the glasses are examined with the fiber viscometer. This measuring process is also performed according to DIN ISO 7884-3. The temperature for which the viscosity is $10^{6.5}$ dPa·s is interpolated with the assistance of the data measured with the aforementioned analytical method and the VFT approximation (Vogel-Fulcher-Tammann equation).

The value for $d\varnothing/dt$ results from an approximation $d\varnothing/dt \approx \Delta\varnothing/\Delta\varnothing(t)$, with $\Delta\varnothing(t)=\varnothing(t)-\varnothing(t_0)$ and $\Delta t = t-t_0$. $\varnothing(t_0)=0$ and $t_0=0$ are defined. At the beginning of the crystal growth analysis the material is always glassy, that is free of crystals, that is $\varnothing(t_0)=0$.

The inventors surprisingly found that a crystallization tendency can be avoided if the glass is free of elements from the earth alkali metal group.

In addition to the glass composition, the current invention also provides a glass plate, including such glass composition. The glass plate has a thickness of 5 μm to 50 mm, for example 0.8 mm to 20 mm, and can be produced in various methods, for example by means of the draw-method, but also by means of roll or press methods.

The invention also cites a method to produce X-ray and gamma-ray shielding glass plates.

Due to the low crystallization tendency, it is possible to produce the glass with an up-draw process, as well as with a down-draw process. The indicated production methods are only exemplary and are not to be understood as being restrictive in any way. Possible additional production methods are a redraw processes, a roll processes or a press processes. In the up-draw process, the glass composition is initially provided in the form of a melt. Then, a glass ribbon with a thickness in the range of 0.8 mm to 20 mm, for example 0.8 mm to 10 mm are drown upwards against gravity, whereby the glass ribbon is guided in rolls and runs through a cooling section. In the up-draw method for the production of a glass ribbon, essentially three parameters influence the draw process. These are the temperature, the density of the glass and the viscosity of the glass, and the crystallization speed. In the up-draw process, a warm ribbon of a solid glass is drawn from the melt. The pull forces must act against the viscosity of the glass and against gravitational forces. The magnitude of the gravitational force is determined by the density of the glass. If the glass is too dense, this could lead to the glass plate breaking. To compensate this, the temperature can be reduced to increase the viscosity of the glass. The draw speed can also be reduced to allow the glass ribbon more time for cooling along the thickness. The viscosity of the glass can be increased with reduced draw speed. Due to the crystallization phenomenon, it is however not always possible to reduce the temperature as much as necessary or to increase the draw dwell time. Also, the control of the crystallization is a very essential point if glasses are to be produced in accordance with the up-draw process.

For a glass with a composition of:
  4-6 weight-%, for example 4.29 weight-% BaO
  0.1-3 weight-%, for example 0.55 weight-% $K_2O$
  0.05-2 weight-%, for example 0.06 weight-% $Na_2O$
  60-70 weight-%, for example 65.68 weight-% PbO
  0.1-0.5 weight-%, for example 0.28 weight-% $Sb_2O_3$
  20-35 weight-%, for example 28.12 weight-% $SiO_2$
  0.05-5 weight-%, for example 1.02 weight-% $ZrO_2$
it was noted that this is difficult to achieve with the assistance of an up-draw process, since the crystallization tendency of these glasses is too high due to a BaO-content that, in the present embodiment is almost 5%. The crystals in this glass moreover reduce the quality of the surface and the transmission. An alternative production method with which a plate can be produced from one of the previously specified glasses with high BaO content is for example casting with subsequent cutting. Glasses produced in this manner have a transmission of greater than 75%, for example greater than 80% at a wavelength of 400 nm and a thickness of 10 mm.

If glasses are free of BaO except for contaminants, such crystallization processes can be avoided, which is why an up-draw process as described above can be used. In addition to the up-draw process, wherein the glass ribbon is drawn upward from the melt against gravitational forces, it is naturally also possible to produce a glass ribbon in a down-draw process. With the down-draw process especially thin glasses can be produced. A glass that is BaO-free except for contaminants can be within the composition range of:
  1-4 weight-%, for example 2.46 weight-% $B_2O_3$
  0.1-3 weight-%, for example 2.52 weight-% $K_2O$
  0.05-2 weight-%, for example 1.48 weight-% $Na_2O$
  55-70 weight-%, for example 60.67 weight-% PbO
  0.1-0.5 weight-%, for example 0.28 weight-% $Sb_2O_3$
  20-35 weight-%, for example 31.32 weight-% $SiO_2$
  0.5-2 weight-%, for example 1.00 weight-% $ZrO_2$ Such a glass can be drawn easily with the assistance of a down-draw process. It maoreover provides high transparency of more than 75%, for example more than 80% at a wavelength of 400 nm and a thickness of 10 mm.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 illustrates a device for determining the crystallization kinetic;

FIG. 2a illustrates the behavior of the crystallization kinetic dØ/dt in μm/min. relative to temperature, that correlates with the viscosity in dPa·s for glass per example 1 in Table 1, whereby the abscissa is logarithmically divided;

Corresponding reference characters indicate corresponding parts throughout the several views. The exemplifications set out herein illustrates embodiments of the invention and such exemplifications are not to be construed as limiting the scope of the invention in any manner.

DETAILED DESCRIPTION OF THE INVENTION

Figure 2B:
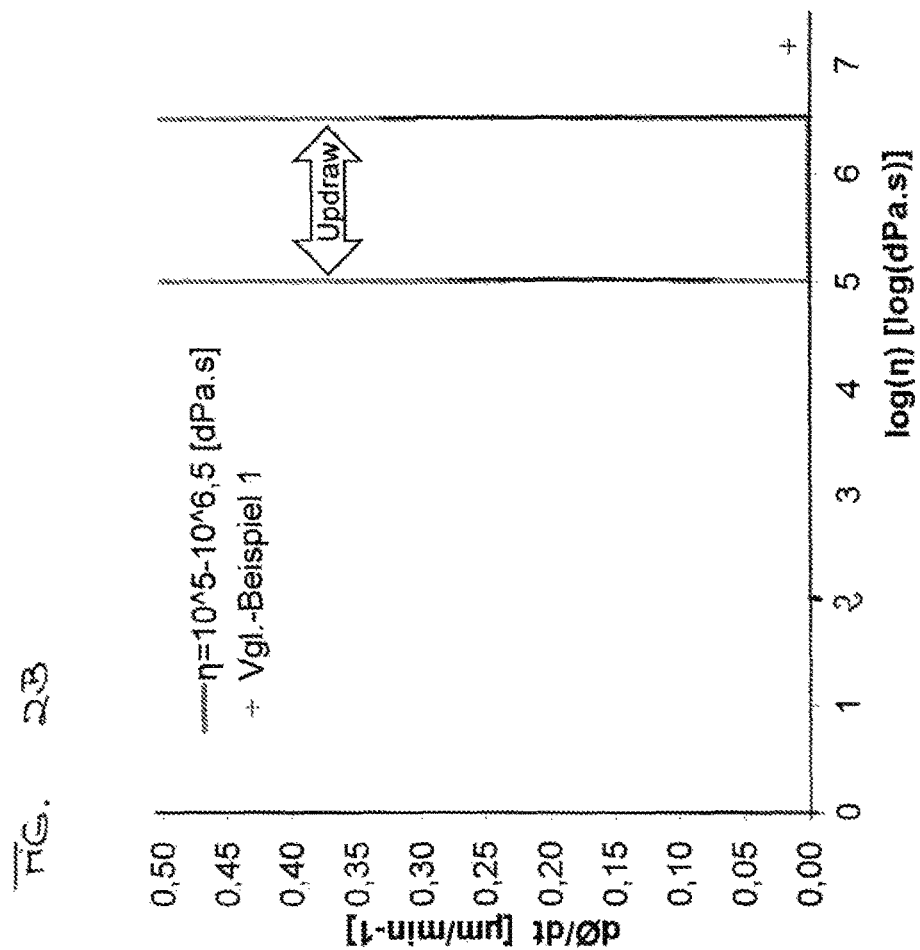
FIG. 2b illustrates the behavior of the crystallization kinetic dØ/dt in μm/min. relative to temperature, that correlates with the viscosity in dPa·s for a glass according to comparative example 1 in Table 1, whereby the abscissa is logarithmically divided.

For two embodiments with a $ZrO_2$ content of 1 weight-% according to the invention, the increased resistance to a weight loss due to the influence of an aqueous solution according to DIN ISO 695 is shown below in comparison with comparative examples. To demonstrate the resistance, the surface weight loss, the so-called surface ablation in mg/100 $cm^2$ is determined by three-hour cooking in a mixture of same volume shares of a sodium hydroxide solution of 1 mol/l and sodium-carbonate solution with a concentration of 0.5 mol/l.

A first composition of a glass according to the invention includes:
  4.29 weight-% BaO
  0.55 weight-% $K_2O$
  0.06 weight-% $Na_2O$
  65.68 weight-% PbO
  0.28 weight-% $Sb_2O_3$
  28.12 weight-% $SiO_2$
  1.02 weight-% $ZrO_2$ For this, a value of 240 mg/100 $cm^2$ surface ablation is measured according to ISO DIN 695.

An alternative composition of a glass according to the invention includes:
  2.46 weight-% $B_2O_3$
  2.52 weight-% $K_2O$
  1.48 weight-% $Na_2O$
  60.67 weight-% PbO
  0.25 weight-% $Sb_2O_3$
  31.32 weight-% $SiO_2$
  1.00 weight-% $ZrO_2$ This alternative glass has a value for the surface ablation of 291 mg/100 $cm^2$ (according to ISO DIN 695). Because of the low crystallization tendency, the alternative glass can be drawn in the up-draw as well as in the down-draw process.

Moreover, the glass according to example 1, as well as the glass according to example 2 has a high transmission of more than 75% at 400 nm wavelength and a plate thickness of 10 mm.

In contrast to above glasses, the comparative glasses have a $ZrO_2$-content of 0 weight-%. For these glasses without $ZrO_2$, the weight loss at 591 mg/100 cm² or 564 mg/100 cm² respectively is almost twice as high as for the inventive glasses with a $ZrO_2$ content of 1 weight-%. As can be seen from the comparative examples, the hydrolytic resistance is surprisingly increased by the $ZrO_2$-content according to the invention. This is also clarified by Table 1 below, when viewing comparative examples 1 and 2.

BaO-content of 0 weight-% are characterized by a very low crystallization tendency, resulting in being easy to draw and high transmission.

FIG. 1 illustrates schematically a device to determine the crystallization kinetic. The device includes a plate 1 with uniformly spaced apart recesses 3. Glass samples 5 are inserted into the recesses and are thermalized at different temperatures for 16 hours in a gradient kiln, contingent upon the arrangement of recesses 5. In FIG. 1 this is identified with Phase 1. After thermalization, glass samples 5 are illuminated with the assistance of a microscope 7 with polarized light and from the measurement with the microscope the average size of the crystals is determined and from this in turn the crystal growth kinetic dØ/dt for each recess temperature. This is identified as Phase 2 in FIG. 1. The

TABLE 1

| Weight-% | Example 1 | Comparison Example 1 | Example 2 | Comparison Example 2 | Example 3 | Example 4 |
|---|---|---|---|---|---|---|
| $B_2O_3$ | 0 | 2.49 | 2.46 | 2.46 | 2.07 | 1.89 |
| $Al_2O_3$ | 0 | 0 | 0 | 1 | 0 | 0 |
| BaO | 4.29 | 0 | 0 | 0 | 0 | 0 |
| $K_2O$ | 0.55 | 2.54 | 2.52 | 2.52 | 2.12 | 1.94 |
| $Na_2O$ | 0.06 | 1.49 | 1.48 | 1.48 | 1.24 | 1.14 |
| PbO | 6.68 | 61.29 | 60.67 | 60.68 | 66.96 | 69.74 |
| $Sb_2O_3$ | 0.28 | 0.25 | 0.25 | 0.25 | 0.21 | 0.19 |
| $SiO_2$ | 28.12 | 31.94 | 31.62 | 31.62 | 26.56 | 24.33 |
| $ZrO_2$ | 1.02 | 0 | 1 | 0 | 0.84 | 0.77 |
| Σ: | 100 | 100 | 100 | 100 | 100 | 100 |
| Alkaline solution DIN ISO 695 class | A3 | A3 | A3 | A3 | — | — |
| Resistance per DIN ISO 695 weight loss mg/100 cm² | 240 | 591 | 291 | 564 | — | — |
| Transmission (thickness = 10 mm) λ = 400 nm: | 0.802 | 0.847 | 0.821 | 0.825 | 0.798 | 0.7507 |
| Max dØ/dt µm/min. (log(η) log (dPa · s)) (retention time = 16 hrs.) | 0.250 (4.87) | 0.015 (7.17) | — (—) | — (—) | 0.011 (4.84) | 0.061 (5.41) |

The lye class of the alkali resistance according to ISO 695 is stated in Table 1 for example 1 and example 2, as well as for the comparison examples, as well as the resistance according to ISO 695 against a weight loss in mg/100 cm². As can be seen in Table 1, the weight loss for example 1 and example 2 is only half as great than that of the comparison examples. This is due to the $ZrO^2$ content in the glass compositions. It is further shown in the Table that the transmission of a 10 mm thick plate and a wavelength of λ=400 nm is greater than 75%. In current example 2 a transmission of 0.82 is achieved. Moreover, the maximum crystallization rate dØ/dt is specified in Table 1 for the various glass compositions. The specified value specifies herein the crystallization rate in µm/min after 16 hours. Also, stated, in parenthesis after the crystallization rate is the viscosity of the melt in log(dPa·s). As can be seen in Table 1, in example 1 that contains BaO, the crystallization rate is very high at a viscosity of log η=4.87 log(dPa·s). The high crystallization rate calls for a rapid formation of crystals in a glass according to example 1, with 4.29 weight-% BaO, resulting in that the glass is difficult to produce. A glass of this type can be produced through casting, since a draw process of such glass compositions is eliminated.

Also specified are examples 3 and 4 for zirconium based lead glasses according to the invention which are also characterized by a high transmission at 400 nm wavelength. Examples 2 and 3 with a lead content <67 weight-% are also specified. Glasses with a lead content <67 weight-% and a measurements are performed in a temperature range between 500° C. and 1000° C. Since in measurements in a gradient kiln can only be performed in a 200° C. wide temperature range, the temperatures are recorded gradually in 200° C. steps.

FIG. 2a illustrates the crystallization kinetic subject to the viscosity for the glass with the composition from example 1, according to Table 1. The greatest crystallization kinetic dØ/dt results from approximately 0.25 µm/min. at a viscosity η of approximately equal to $10^5$ dPa·s (log(η)=5 log (dPa·s). As can be seen in FIG. 2a, the crystallization kinetic in the viscosity range of η=$10^5$ dPa·s to $10^{6.5}$ dPa·s (respectively log(η)=5 log(dPa·s) and log(η)=6.5(log(dPa·s) that is used for draw processes like the up-draw process is so high that drawing the glass composition is not possible. The reason for this is the high BaO content.

In contrast to the composition according to example 1, the composition according to example 2 can be produced in a draw process. The reason for this is the presence of $B_2O_3$ in the composition according to example 2. $B_2O_3$ lowers the crystallization kinetic drastically so that the glass can be produced in a draw process. This also applies to examples 3 and 4 with a $B_2O_3$ content of 1 to 3 weight-% $B_2O_3$ whose crystallization rate is below 0.1 µm/min.

The draw characteristic of the glass according to the comparison example 1 can be gathered from the crystallization kinetic dØ/dt per FIG. 2b.

FIG. 2b illustrates the crystallization kinetic subject to the viscosity for the glass with the composition per comparison example 1, according to Table 1. The greatest crystallization kinetic dØ/dt results from approximately 0.015 μm/min. at a viscosity η of approximately equal to $10^{7.17}$ dPa·s (log(η)= 7.17 log (dPa·s)).

As can be seen in FIG. 2b, the crystallization kinetic in the viscosity range of η=$10^5$ dPa·s to $10^{6.5}$ dPa·s (respectively log(η)=5 log(dPa·s) and log(η)=6.5 log(dPa·s) which is used for draw processes like the up-draw process is practically at 0, so that the glass according to comparison example 1 can be easily drawn in contrast to the glass according to example 1. This is due to the fact that the glass composition is BaO-free with the exception of contaminants. This also applies to the composition according to example 2, which is why this glass can also be drawn easily.

Figure 3:
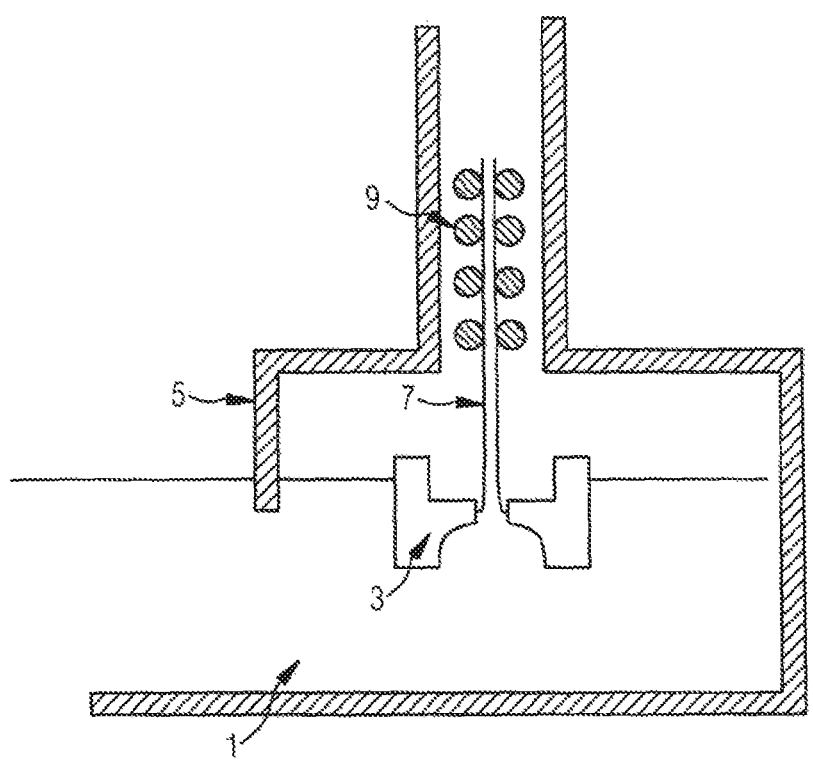
FIG. 3 illustrates a device for an up-draw-process.

FIG. 3 illustrates a device for implementation of an up-draw process, for example for a glass composition according to comparison example 1. The melt with the inventive glass composition is identified as 100 and the draw nozzle through which the melt is drawn as 103. Refractory wall of the draw tank is identified as 105. A glass ribbon 107 is guided upwards over rolls 109 and is cooled in a cooling section. The glass ribbon thus drawn in an upward directed draw process, the so-called up-draw process has a thickness in the range of 0.8-20 mm.

The glass composition according to the present invention offers a glass composition for the first time that is characterized by high hydrolytic resistance, as shown by the examples in contrast to the comparison tests.

The glasses moreover have a low crystallization tendency and such crystallization kinetic that it is possible to draw such glass compositions—for example without limitation thereto—in an up-draw process into glass ribbons or glass plates having high transmission, for example greater than 75%, for example greater than 80% at 400 nm wavelength and a 10 mm thick plate. The plates produced from the inventive glass compositions moreover are characterized by a high transmission greater than 75%, for example greater than 80% at 400 nm wavelength with 10 mm thick plates.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An X-ray and gamma-ray shielding glass, comprising the following components in weight-%:
   10-35% $SiO_2$;
   60-70% PbO;
   0-8% $B_2O_3$;
   0-10% $Al_2O_3$;
   0-10% $Na_2O$;
   0-10% $K_2O$;
   0-0.3% $As_2O_3$;
   0-2% $Sb_2O_3$;
   0-6% BaO; and
   0.05-2% $ZrO_2$.

2. The X-ray and gamma-ray shielding glass composition according to claim 1, wherein said glass includes the following composition in weight-%:
   20-30% $SiO_2$;
   60-67% PbO;
   1-5% $B_2O_3$;
   0% $Al_2O_3$;
   0.05-2% $Na_2O$;
   0.1-3% $K_2O$;
   0-0.3% $As_2O_3$;
   0.1-0.5% $Sb_2O_3$;
   0% BaO; and
   0.1-2% $ZrO_2$.

3. The X-ray and gamma-ray shielding glass composition according to claim 1, wherein said glass includes the following composition in weight-%:
   20-30% $SiO_2$;
   60-65% PbO;
   1.5-2.5% $B_2O_3$;
   0% $Al_2O_3$;
   0.05-2% $Na_2O$;
   0.1-3% $K_2O$;
   0-0.3% $As_2O_3$;
   0.1-0.5% $Sb_2O_3$;
   0% BaO; and
   0.5-2% $ZrO_2$.

4. The X-ray and gamma-ray shielding glass composition according to claim 1, wherein said glass includes the following composition in weight-%:
   20-30% $SiO_2$;
   60-65% PbO;
   1.5-2.5% $B_2O_3$;
   0% $Al_2O_3$;
   0.05-2% $Na_2O$;
   0.1-3% $K_2O$;
   0-0.3% $As_2O_3$;
   0.1-0.5% $Sb_2O_3$;
   0% BaO; and
   1-2% $ZrO_2$.

5. The X-ray and gamma-ray shielding glass composition according to claim 1, wherein said glass is BaO-free, except for contaminants.

6. The X-ray and gamma-ray shielding glass composition according to claim 1, wherein said glass also includes at least one of 1-8 weight-% $B_2O_3$, 0.5-6 weight-% $B_2O_3$, and 1-5 weight-% $B_2O_3$.

7. The X-ray and gamma-ray shielding glass composition according to claim 1, wherein the composition is selected so that a kinetic of crystallization dØ/dt is at least one of less than 0.2 μm/min., less than 0.1 μm/min., less than 0.05 μm/min., and less than 0.02 μm/min.

8. The X-ray and gamma-ray shielding glass composition according to claim 1, wherein except for contaminants, the glass does not contain at least one of SrO and MgO.

9. The X-ray and gamma-ray shielding glass composition according to claim 1, wherein said glass includes the following composition in weight-%:
   25-35% $SiO_2$;
   60-70% PbO;
   0.5-2% $Na_2O$;
   0.5-3% $K_2O$;
   0.5-0.75% $Sb_2O_3$;
   0.05-5% $ZrO_2$; and
   0-5% BaO;
   and in that except for contaminants, the composition is free of $B_2O_3$, SrO, $As_2O_3$.

10. A glass plate, comprising the following components in weight-%:
    10-35% $SiO_2$;
    60-70% PbO;
    0-8% $B_2O_3$;
    0-10% $Al_2O_3$;
    0-10% $Na_2O$;

0-10% K$_2$O;
0-0.3% As$_2$O$_3$;
0-2% Sb$_2$O$_3$;
0-6% BaO; and
0.05-2% ZrO$_2$, wherein the glass plate has a thickness in the rage of 5 µm to 50 mm.

11. The glass plate according to claim 10, wherein said thickness is in the range of 25 µm to 20 mm.

12. The glass plate according to claim 10, wherein said thickness is in the range of 0.8 mm to 10 mm.

13. The glass plate according to claim 10, wherein at a thickness of 10 mm and a wavelength of 400 nm, the glass plate has a transmission which is at least one of >50%, >70%, >75%, and >80%.

14. The glass plate according to claim 13, wherein at a thickness of 10 mm and a wavelength of 400 nm, the glass plate has a transmission in the range of 75% to 90%.

15. A method to produce gamma-ray shielding glass plates, wherein the method comprises the following steps:
    providing a glass composition including the following components in weight-%: 10-35% SiO$_2$, 60-70% PbO, 0-8% B$_2$O$_3$, 0-10% Al$_2$O$_3$, 0-10% Na$_2$O, 0-10% K$_2$O, 0-0.3% As$_2$O$_3$, 0-2% Sb$_2$O$_3$, 0-6% BaO, and 0.05-2% ZrO$_2$;
    drawing a glass ribbon with a thickness in the range of 0.8 mm to 20 mm upwards from a melt against gravitational force,
    guiding the glass ribbon by a plurality of rolls;
    running the glass ribbon through a cooling section; and
    cutting the glass ribbon into glass plates.

16. The method according to claim 15, wherein said thickness of the glass ribbon is in the range of 0.8 mm to 10 mm.

17. A method to produce gamma-ray shielding glass plates, wherein the method comprises the following steps:
    providing a glass composition including the following components in weight-%: 10-35% SiO$_2$, 60-70% PbO, 0-8% B$_2$O$_3$, 0-10% Al$_2$O$_3$, 0-10% Na$_2$O, 0-10% K$_2$O, 0-0.3% As$_2$O$_3$, 0-2% Sb$_2$O$_3$, 0-6% BaO, and 0.05-2% ZrO$_2$;
    drawing a glass ribbon with a thickness in the range of 25 µm-1.1 mm downwards from a melt with the gravitational force,
    guiding the glass ribbon by a plurality of rolls;
    running the glass ribbon through a cooling section; and
    cutting the glass ribbon into glass plates.

18. The method according to claim 15, wherein the method is performed so that a kinetic of crystallization of the glass composition $d\emptyset/dt$ is at least one of less than 0.3 µm/min., less than 0.2 µm/min., less than 0.1 µm/min., less than 0.05 µm/min., and less than 0.02 µm/min.

19. The method according to claim 17, wherein the method is performed so that a kinetic of crystallization of the glass composition $d\emptyset/dt$ is at least one of less than 0.3 µm/min., less than 0.2 µm/min., less than 0.1 µm/min., less than 0.05 µm/min., and less than 0.02 µm/min.

* * * * *